(12) United States Patent
Peters et al.

(10) Patent No.: US 8,227,136 B2
(45) Date of Patent: Jul. 24, 2012

(54) USING IONOMER TO MILITATE AGAINST MEMBRANE BUCKLING IN THE TENTING REGION

(75) Inventors: Scott L. Peters, Rochester, NY (US); Craig S. Gittleman, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 829 days.

(21) Appl. No.: 12/261,591

(22) Filed: Oct. 30, 2008

(65) Prior Publication Data

US 2010/0112405 A1    May 6, 2010

(51) Int. Cl.
*H01M 8/10* (2006.01)
*H01M 2/08* (2006.01)

(52) U.S. Cl. ........ 429/483; 429/402; 429/492; 429/508; 429/510

(58) Field of Classification Search .................. 429/402, 429/483, 492, 508, 510
See application file for complete search history.

(56) References Cited

U.S. PATENT DOCUMENTS

| | | | |
|---|---|---|---|
| 6,309,773 B1 * | 10/2001 | Rock | 429/443 |
| 7,459,227 B2 | 12/2008 | Rock et al. | |
| 2007/0134538 A1 | 6/2007 | Yuichi et al. | |
| 2009/0214915 A1 * | 8/2009 | Kwon | 429/26 |

FOREIGN PATENT DOCUMENTS

CN   101188303 A   5/2008

* cited by examiner

*Primary Examiner* — Ling-Siu Choi
(74) *Attorney, Agent, or Firm* — Fraser Clemens Martin & Miller LLC; J. Douglas Miller

(57) ABSTRACT

A unitized electrode assembly for a fuel cell comprising an electrolyte membrane, a subgasket, and a sealing bead disposed therebetween is disclosed. The sealing bead adapted to fill a tenting region formed between the membrane and the subgasket to maximize an operating life of the electrolyte membrane by militating against wear of membrane expansion during use of the fuel cell.

16 Claims, 4 Drawing Sheets

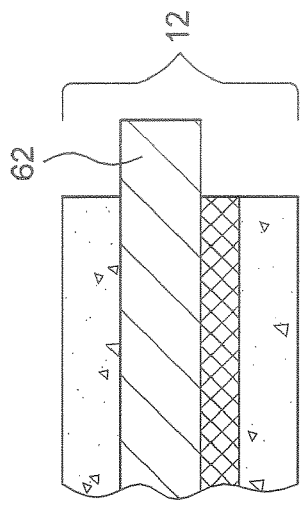
FIG. 3
(PRIOR ART)
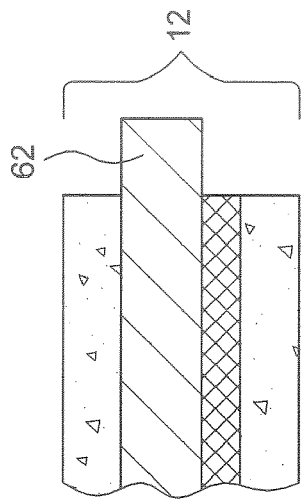
FIG. 4
(PRIOR ART)
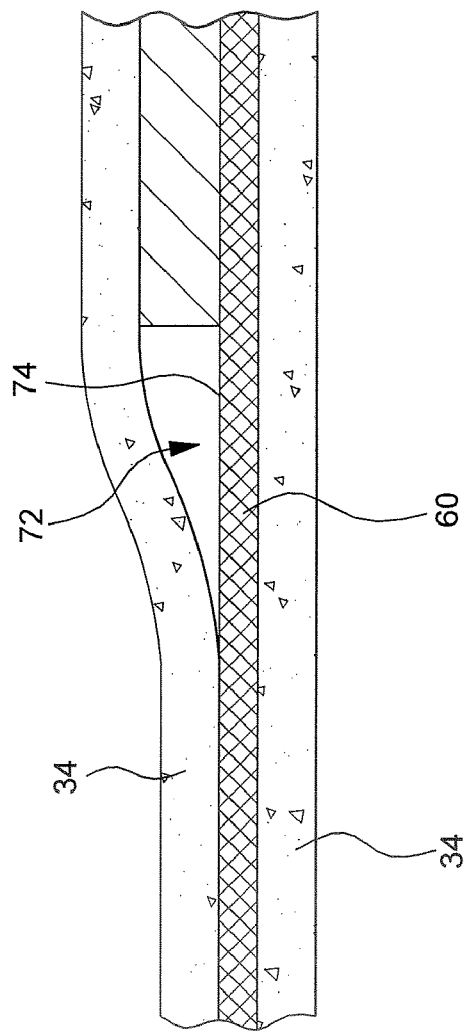
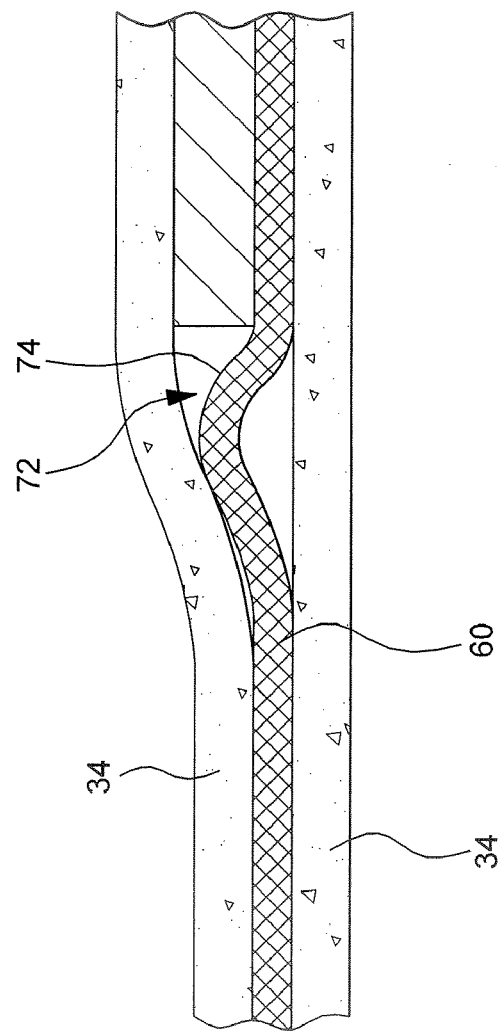

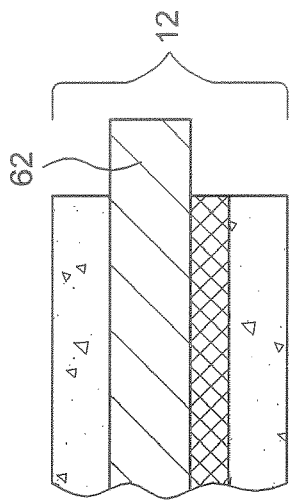
FIG. 5
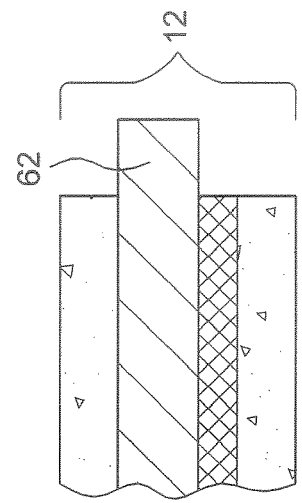
FIG. 6
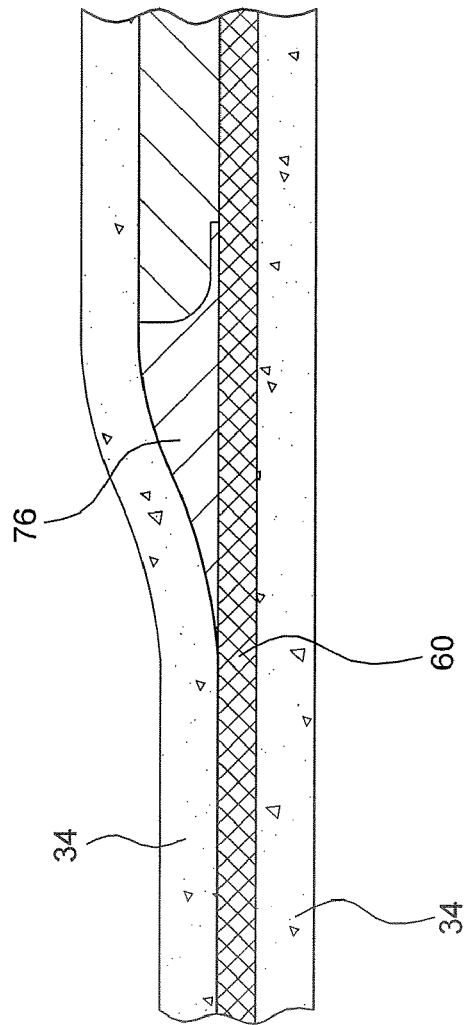
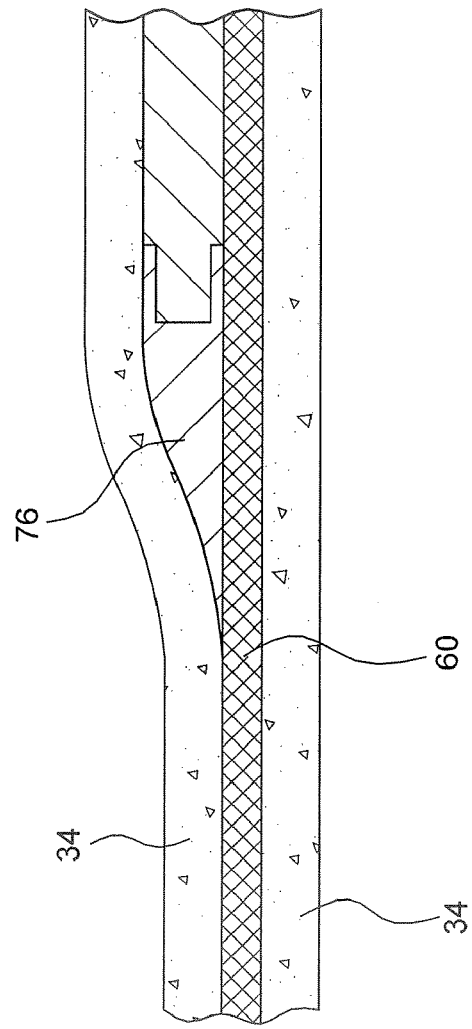

USING IONOMER TO MILITATE AGAINST MEMBRANE BUCKLING IN THE TENTING REGION

FIELD OF THE INVENTION

The present disclosure relates to a fuel cell assembly, and more particularly to subgaskets used in membrane fuel cell assemblies.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

A common type of fuel cell is known as a proton exchange membrane (PEM) fuel cell. The PEM fuel cell includes a unitized electrode assembly (UEA) disposed between a pair of bipolar plates. The UEA comprises anode and cathode diffusion media (DM), anode and cathode electrodes, and an electrolyte membrane. The order of the UEA components is critical for fuel cell operation. Respectively, the order of the components is: the anode DM, the anode electrode, the electrolyte membrane, the cathode electrode, and the cathode DM. The cathode and anode electrodes typically include a finely divided catalyst, such as platinum, supported on carbon particles and mixed with an ionomer. The electrolyte membrane may be disposed against a subgasket that outlines a periphery of the fuel cell plate. The subgasket may be a stiff film having electrical insulating properties, as desired. The DM facilitates a delivery of gaseous reactants, typically the hydrogen and the oxygen, to an active region defined by an inner edge of the subgasket of the UEA for an electrochemical fuel cell reaction. The DM also aids in the management of water byproduct within the fuel cell. The subgaskets separate the fuel cell into an anode side and a cathode side, and electrically insulate the anode side from the cathode side. A sealing portion disposed on the subgasket militates against the gaseous reactants from escaping the fuel cell. The UEA components can be laminated together to form the UEA.

The UEA is disposed between the pair of bipolar plates, which act as current collectors for the fuel cell. Each of the bipolar plates has ports and feed regions, for the supply and exhaust of the gaseous reactants. The feed regions act to distribute or collect the gaseous reactants within the fuel cell. The supply feed region includes supply ports that distribute the gaseous reactants from a supply manifold to the active region of the fuel cell via a flow field formed by a plurality of channels in the bipolar plate. The opposing or outlet end of the bipolar plate has an exhaust feed region that includes exhaust ports where collected gaseous reactants leave the fuel cell and enter an exhaust manifold. The subgasket may be used to provide electrical insulation between the bipolar plates. In the area of the feed regions, the stiffness of the subgasket is an important factor in producing the proper interface between the plurality of flow channels and the subgasket. The subgasket must be sufficiently stiff to militate against the subgasket intruding into and restricting flow in the plurality of channels forming the feed regions.

The stack, which can contain more than one hundred plates, is compressed, and the elements held together by any conventional fastening means and anchored to clamping plates at the ends of the stack. In order to militate against the undesirable leakage of fluids, the sealing portion is compressed between the plate assemblies. The sealing portion is disposed along a peripheral edge of both sides of the subgasket and may be integrally formed with the subgasket. The UEA is secured by the use of stack compression and a land formed in the plate, which corresponds to the sealing portion of the UEA. Prior art subgaskets have incorporated designs having a constant thickness from the active region of a fuel cell, across and past the sealing portion. The prior art subgaskets, despite being functional, may result in a shortened life of a fuel cell in many ways. The prior art subgaskets may be relatively thick (a thick subgasket) when compared to a thickness of the membrane. A contrast of thickness between the thick subgasket and the membrane may lead to a localized area of high compression. The localized areas of high compression may lead to crushed DM, cracked anodes or cathodes, plate deformation, and shearing of the electrolyte membrane, any of which may lead to a shortened life of the fuel cell or a poor performance thereof. Alternately, the prior art subgaskets may be relatively thin (a thin subgasket) when compared to a thickness of the membrane. A low contrast of thickness between the thin subgasket and the membrane may lead to an excessive deflection of the subgasket by a flow of reactant gases.

Generally, the life of the membrane may be shortened as a result of one of a UEA over-compression and a UEA under-compression. Swelling of the membrane may cause one of the UEA over-compression and the UEA under-compression. Electrolyte membranes require certain humidity levels within a fuel cell for proper operation. In anticipation of fuel cell start up or shut down, the humidity levels may be varied as desired for optimal performance of the fuel cell. Membranes within the fuel cell may absorb water, causing membrane dimensions to vary with humidity. Conversely, the subgaskets maintain excellent dimensional stability with variances in humidity. Particularly, repeated expansion and contraction of the membrane at the contact edge of a thick subgasket and the electrolyte membrane in the fuel cell may lead to shortened fuel cell life.

Over-compression may be caused by a swelling of the membrane, as well as manufacturing processes used to form the UEA. The swelling of the membrane may affect a length, a width, and a thickness of the membrane. The UEA over-compression may be caused by the thickness of the membrane increasing as a result of the swelling. The thickness of the membrane increasing as a result of the swelling creates a compressive load variance across the UEA. The compressive load variance across the UEA creates a stress concentration at the inner subgasket edge. The stress concentration at the inner subgasket edge negatively affects a life of the membrane. Additionally, the thickness of the membrane increasing as a result of the swelling may increase the compressive load on the UEA in the subgasket area, causing a permanent deformation of the bipolar plate and adjacent DM.

Under-compression may occur in a tenting region adjacent the inner subgasket edge. The tenting region is an area of the UEA adjacent the subgasket edge where the compressive load on the membrane is significantly reduced or eliminated. The DM may act to bridge the step formed by an inner edge thickness of the subgasket. The DM may flexibly conform across the step formed by an inner edge thickness of the subgasket, resulting in a wedge shaped span located within the tenting region. Upon humidification of the membrane, the length and the thickness of the membrane may increase. The humidified membrane may swell into the tenting region. As a result of the UEA under-compression, the membrane may buckle. A buckling of the membrane may cause one of the anode electrode and the cathode electrode formed thereon to crack.

It would be desirable to produce a UEA for a fuel cell having a subgasket, wherein the effects of stress on the membrane caused by the humidity change thereof are minimized to prolong an operating life of the UEA.

SUMMARY OF THE INVENTION

Presently provided by the invention, a UEA for a fuel cell having a subgasket, wherein the effects of stress on the membrane caused by the humidity change thereof are minimized to prolong an operating life of the UEA, has been surprisingly discovered.

In a first embodiment, a unitized electrode assembly for a fuel cell comprises an electrolyte membrane; a subgasket disposed adjacent the electrolyte membrane; and a sealing bead disposed adjacent the subgasket and the electrolyte membrane, the sealing bead adapted to militate against deflection of the electrolyte membrane during operation of a fuel cell.

In another embodiment, a unitized electrode assembly for a fuel cell comprises an electrolyte membrane; a subgasket disposed adjacent the electrolyte membrane; a diffusion medium having a first portion disposed adjacent the electrolyte membrane and a second portion disposed adjacent a portion of the subgasket; and a sealing bead disposed adjacent the subgasket and the electrolyte membrane, the sealing bead adapted to militate against deflection of the electrolyte membrane during operation of a fuel cell by filling a void created between the diffusion medium, the sealing bead, and the subgasket.

In a further embodiment, a method of forming a unitized electrode assembly for a fuel cell comprises the steps of providing an electrolyte membrane; providing a subgasket disposed adjacent the electrolyte membrane; providing a diffusion medium having a first portion disposed adjacent the electrolyte membrane and a second portion disposed adjacent a portion of the subgasket; providing a sealing bead disposed adjacent the subgasket and the electrolyte membrane, the sealing bead adapted to militate against deflection of the electrolyte membrane during operation of a fuel cell; and hot pressing the assembled membrane, subgasket, diffusion media, and sealing bead, wherein a void created by the assembled membrane, the diffusion medium, and the subgasket is filled by the sealing bead during hot pressing.

BRIEF DESCRIPTION OF THE DRAWINGS

The above as well as other advantages of the present invention, will become readily apparent to those skilled in the art from the following detailed description of embodiments of the invention when considered in the light of the accompanying drawings in which:

FIG. 3 is a fragmentary side, cross-sectional view of the unitized electrode assembly illustrated in FIG. 2 taken along line 3-3;

FIG. 4 is a fragmentary side, cross-sectional view of the unitized electrode assembly illustrated in FIG. 3, the electrolyte membrane shown in a humidified and buckled state;

FIG. 5 is a fragmentary side, cross-sectional view of a unitized electrode assembly according to an embodiment of the present disclosure; and FIG. 6 is a fragmentary side, cross-sectional view of the unitized electrode assembly according to another embodiment of the present disclosure.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
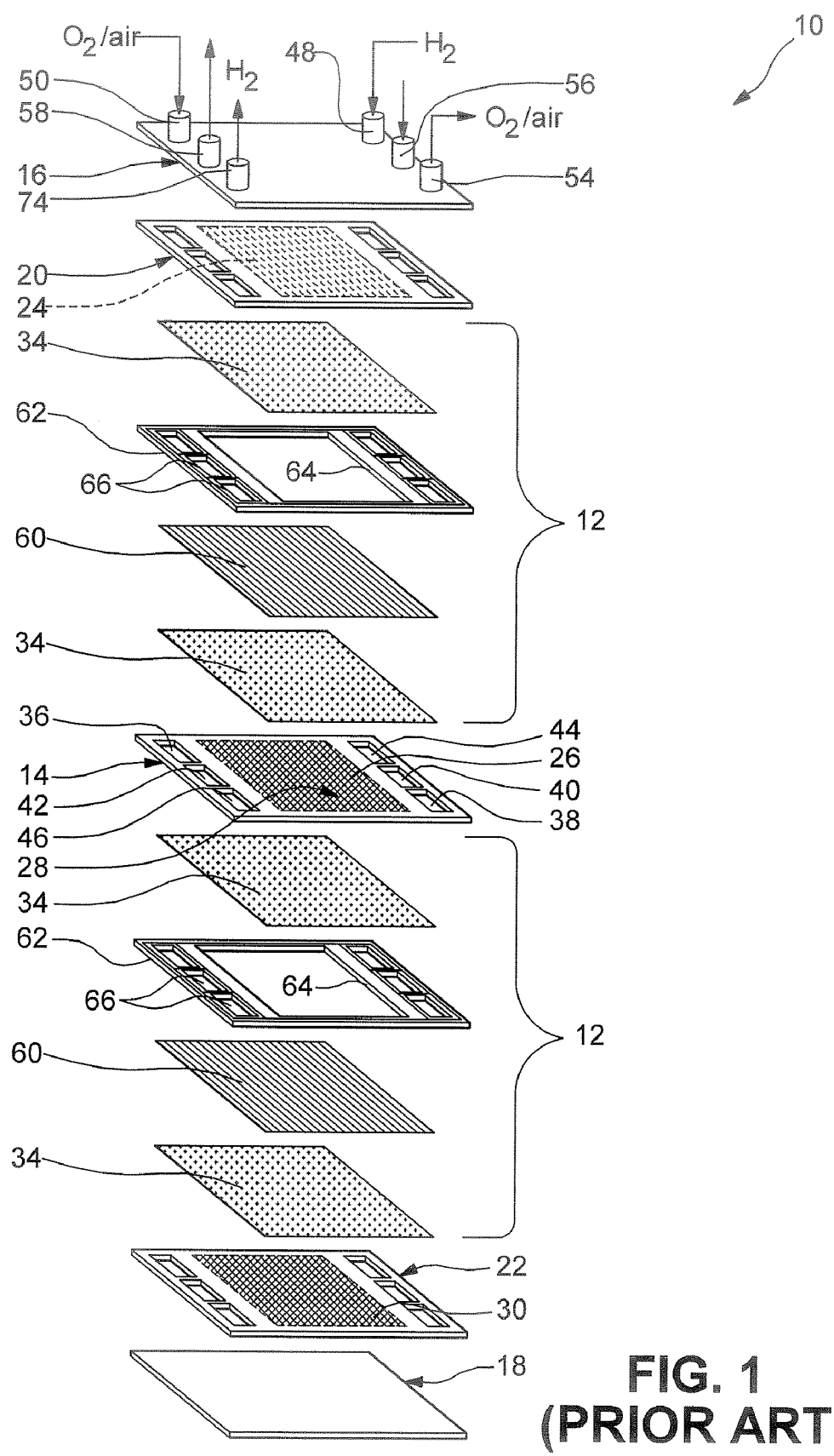
FIG. 1 is an exploded perspective view o an illustrative fuel cell stack known in the art.

FIG. 1 depicts an illustrative fuel cell stack 10 having a pair of UEAs 12 separated from each other by an electrically conductive bipolar plate 14. For simplicity, only a two-cell stack (i.e. one bipolar plate) is illustrated and described in FIG. 1, it being understood that the typical fuel cell stack 10 has many more such cells and bipolar plates.

The UEAs 12 and bipolar plate 14 are stacked together between a pair of clamping plates 16, 18 and a pair of unipolar end plates 20, 22. The clamping plates 16, 18 are electrically insulated from the end plates 20, 22 by a seal or a dielectric coating (not shown). The unipolar end plate 20, both working faces of the bipolar plate 14, and the unipolar end plate 22 include respective active areas 24, 26, 28, 30. The active areas 24, 26, 28, 30 are typically flow fields for distributing gaseous reactants such as hydrogen gas and air over an anode and a cathode, respectively, of the UEAs 12.

The bipolar plate 14 is typically formed by a conventional process for shaping sheet metal such as stamping, machining, molding, or photo etching through a photolithographic mask, for example. In one embodiment, the bipolar plate 14 is formed from unipolar plates which are then joined by any conventional process such as welding or adhesion. It should be further understood that the bipolar plate 14 may also be formed from a composite material. In one particular embodiment, the bipolar plate 14 is formed from a graphite or graphite-filled polymer. Gas-permeable diffusion media 34 are disposed adjacent the UEAs 12. The end plates 20, 22 are also disposed adjacent the diffusion media 34, respectively, while the active areas 26, 28 of the bipolar plate 14 are disposed adjacent the diffusion media 34.

The bipolar plate 14, unipolar end plates 20, 22, and the UEAs 12 each include a cathode supply aperture 36 and a cathode exhaust aperture 38, a coolant supply aperture 40 and a coolant exhaust aperture 42, and an anode supply aperture 44 and an anode exhaust aperture 46. Supply manifolds and exhaust manifolds of the fuel cell stack 10 are formed by an alignment of the respective apertures 36, 38, 40, 42, 44, 46 in the bipolar plate 14, unipolar end plates 20, 22, and the UEAs 12. The hydrogen gas is supplied to an anode supply manifold via an anode inlet conduit 48. The air is supplied to a cathode supply manifold of the fuel cell stack 10 via a cathode inlet conduit 50. An anode outlet conduit 52 and a cathode outlet conduit 54 are also provided for an anode exhaust manifold and a cathode exhaust manifold, respectively. A coolant inlet conduit 56 is provided for supplying liquid coolant to a coolant supply manifold. A coolant outlet conduit 58 is provided for removing coolant from a coolant exhaust manifold. It should be understood that the configurations of the various inlets 48, 50, 56 and outlets 52, 4 58 in FIG. 1 are for the purpose of illustration, and other configurations may be chosen as desired.

Figure 2:
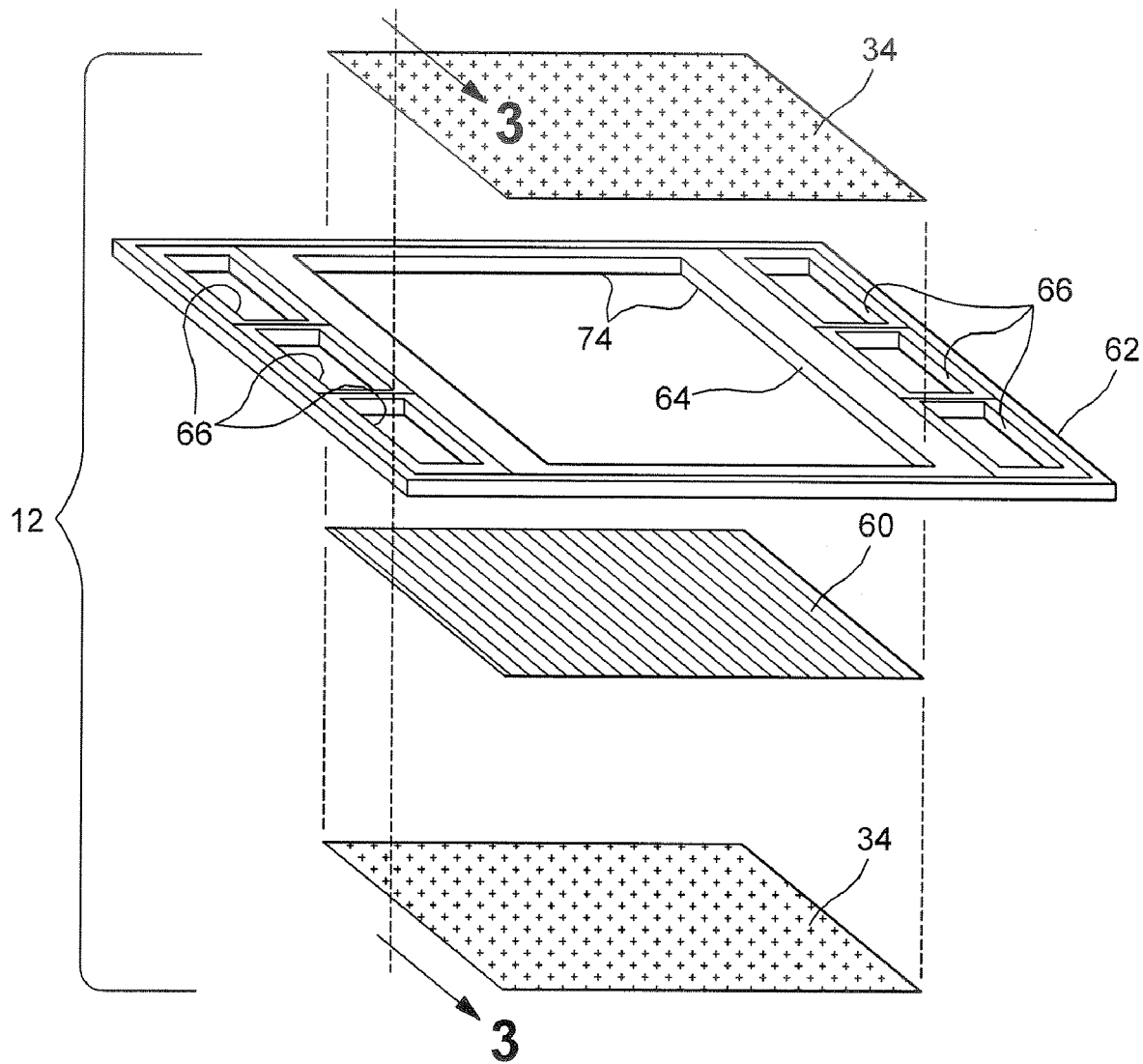
FIG. 2 is an exploded perspective view of an illustrative unitized electrode assembly shown in FIG. 1.

UEAs 12 for use in a fuel cell may include a plurality of components. As shown in FIG. 2, the UEA 12 includes an anode and a cathode, an electrolyte membrane 60, a subgasket 62, and the diffusion media 34. The components of the UEA 12 are assembled during production of the UEA 12 and affixed to one another by any conventional process such as hot pressing, for example. An adhesive may be used between individual components, as desired. For clarity, the diffusion media 34 and electrolyte membrane 60 in FIGS. 1 and 2 have been linearly displaced to show the electrolyte membrane 60.

The anode and the cathode of the fuel cell may be formed by a disposal of a catalyst ink on one of the electrolyte membrane 60 and the diffusion media 34. The catalyst ink may be applied to the components by any conventional process such as spraying, dipping, brushing, roller transfer, slot die coating, gravure coating, Meyer rod coating, decal transfer, and printing, for example. The catalyst ink is applied to a side of the component facing the electrolyte membrane 60. One of the anode and the cathode can be referred to as an electrode.

The electrolyte membrane 60 may be a membrane layer, formed from an ionomer. The ionomer perfluorosulfonic acid (PFSA), such as sold under the trademark Nafion® NRE211, is a typical ionomer well known in the art for use as the electrolyte membrane 60 of a fuel cell. The electrolyte membrane 60 is disposed on one of a first and a second side of the subgasket 62. A primary subgasket aperture 64 substantially corresponding to the active areas 24, 26, 28, 30 of the bipolar plate 14 and the unipolar plate 20, 22 is covered by the electrolyte membrane 60.

The subgasket 62 may be formed from a polymeric film and in the form of a layer. As a nonlimiting example, the polymeric film may be one formed from one of polyethylene terephthalate and polyethylene naphthalate. Other thin films having electrical insulating properties may be used to form the subgasket 62 as well. The subgasket 62 may substantially follow a periphery of the bipolar plate 14 and the unipolar plate 20, 22, and have a plurality of secondary subgasket apertures 66 formed therein corresponding to the apertures 36, 38, 40 42, 44, 46. The subgasket 62 provides a mounting su ace for the electrolyte membrane 60 and the diffusion media 34 and allows one of the bipolar plate 14 and the unipolar plate 20, 22 to be electrically insulated from an adjacent plate.

As illustrated in FIG. 3, specific dimensions of the subgasket 62 may be important for providing adequate sealing between the plates 14, 20, 22 of a fuel cell stack 10. Additionally, specific dimensions may be necessary to militate against adverse effects of expansion and shearing of the electrolyte membrane 60 under compression of the UEA 12. It is well known in the art that the thickness of the subgasket 62 may affect the fuel cell performance, and the thickness of the subgasket 62 should therefore be optimized. A tenting region 72 may be formed between the diffusion media 34 and the electrolyte membrane 60. The tenting region 72 is a portion of the UEA 12 that may be exposed to a low compressive pressure as compared to the active areas 24, 26, 28, 30. Additionally, the tenting region 72 may be characterized by a lack of contact between the components of the UEA 12. The subgasket 62 may be too rigid to optimize a life of the UEA 12. Expansion of the electrolyte membrane 60 may cause a contact edge 74 to pinch the electrolyte membrane 60 where the subgasket 62 is too rigid. Additionally, repeated expansion and contraction of the electrolyte membrane 60 may cause excessive wear of the electrolyte membrane 60 along the contact edge 74 when a UEA over-compression is present.

The tenting region 72 is a void formed adjacent the contact edge 74 of the electrolyte membrane 60, the subgasket 62, and the diffusion media 34 and has a substantially triangular cross sectional shape. Minimization of a total volume of the tenting region 72 is desired to militate against excessive wear and shortened life of one of the electrolyte membrane 60 and diffusion media 34. When the thickness of the subgasket 62 is too small, the subgasket 62 may be subjected to an excessive deflection caused by a flow of gaseous reactants where the diffusion media 34 is not present. When excessively deflected, the subgasket 62 may enter and restrict gaseous reactant communication to and from the active areas 24, 26, 28, 30 of one of the bipolar plate 14 and the unipolar plate 20, 22.

FIG. 4 illustrates the electrolyte membrane 60 in a humidified and deflected or buckled state. Upon humidification, the electrolyte membrane 60 may increase in thickness, length, and width. Bounded by the subgasket 62 onto which the electrolyte membrane 60 is attached, expansion of the electrolyte membrane 60 causes the electrolyte membrane 60 to swell and buckle within the tenting region 72. The electrolyte membrane 60 swells unconstrained into the tenting region 72, freed from a substantially uniform compressive force exerted on the UEA 12 in the area of the subgasket 62 and the active areas 24, 26, 28, 30. Electrodes formed on the electrolyte membrane 60, may crack when the electrolyte membrane 60 buckles. Likewise, an expanding thickness of the electrolyte membrane 60 may increase the compressive force exerted by the contact edge 74 on the electrolyte membrane 60, resulting in one of a fret or a tear in the electrolyte membrane 60. Additionally, the increased compressive force due to the expanding electrolyte membrane 60 may force the subgasket 62 and the diffusion media 34 into an adjacent fuel cell plate, causing wear on one of the adjacent plate and diffusion media 34.

A compressive force exerted on the UEA 12 may cause similar issues. The compressive force may be created during manufacture of the UEA 12 or may be present in the fuel cell stack 10 after assembly. The compressive force may cause the electrolyte membrane 60 to the contact edge 74 resulting in a thinning of the electrolyte membrane 60. Likewise, the compressive force may cause the subgasket 62 and the diffusion media 34 to press against the adjacent fuel cell plate, causing wear of one of the adjacent plate and diffusion media 34.

As shown in FIGS. 5 and 6, a sealing bead 76 according to the present invention is incorporated into the UEA 12. The sealing bead 76 is disposed adjacent the subgasket 62, the diffusion media 34, and the electrolyte membrane 60. The sealing bead 76 is adapted to substantially fill the tenting region 72 when the components of the UEA 12 are assembled. A volume of the sealing bead 76 is optimized to minimize the void space in the tenting region 72 without exposing the subgasket 62 to excessive deflection.

The diffusion media 34 are disposed on a side of the subgasket 62 and may be formed from a conductive and gas permeable material such as carbon fabric or paper. The diffusion media 34 serve as current collectors for the anode and cathode, as well as provide mechanical support for the electrolyte membrane 60. The diffusion media 34 encompass an area greater than the primary subgasket aperture 64 and overlap the edge relief.

The sealing bead 76 may be formed from an ionomer such as a hot melt adhesive, a b-stage adhesive, ethylene vinyl acetate, polyvinylideneifluoride, and a pressure sensitive adhesive, and other conventional adhesives with similar properties, for example. The ionomer may be doped with an additive adapted to militate against the degradation of edge portions of the UEA 12, similar to the doped ionomer of commonly owned patent application Ser. No. 11/557,592, hereby incorporated herein by reference in its entirety. The additive may be one of Cerium, Manganese, Vanadium, Platinum, Ruthenium, Zirconium, Nickel, Chromium, Tungsten, Cobalt, Molybdenum, and Tin. The additive in the ionomer sealing bead 76 may be added in equivalent ratios of metal in the additive to acid in the ionomer in a range from a ratio of about 0.02 to about 0.3. Equivalent ratio is defined as the molar equivalents of the metal in the additive (e.g. three moles of $Ce_3+$) divided by the moles of acid in the ionomer (e.g. one mole of H+). The additive may be added to the sealing bead 76 in a salt form such as Cerium Nitrate, Cerium Sulfate, or Cerium Carbonate, for example. The additive is added to the sealing bead 76 to introduce the additive to edge portions of the UEA 12 susceptible to degradation to militate against the degradation thereof. Edges where the subgasket 62 contacts the electrolyte membrane 60 and diffusion media 34 are portions of the UEA 12 susceptible to degradation, for example.

The sealing bead 76 may be manually applied to an outer peripheral edge of the the diffusion media 34 prior to assembly of the UEA 12 using conventional methods such as by using a syringe, for example. The sealing bead 76 may also be applied to the diffusion media 34 by a screen printing process. The sealing bead 76 is added to each edge of the diffusion media 34 that abuts the subgasket 62 or that is adjacent to a tenting region 74. The sealing bead 74 may be applied to one side of the diffusion media 34, as shown in FIG. 5, or a sealing bead 74 may be formed on each side of the diffusion media 34, as shown in FIG. 6. The UEA 12 is assembled using hot pressing to bond the components thereof together. As the components of the UEA 12 are hot pressed together, the material forming the sealing bead 76 softens and during hot pressing is caused to fill the void space of the tenting region 72. By filling the tenting region 72, deflection or buckling of the electrolyte membrane 60 is minimized during fuel cell operation, thereby minimizing stress on the electrolyte membrane 60 caused by the effects of humidity change thereto and prolonging an operating life of the UEA 12. Alternatively, the sealing bead 76 may be formed on the subgasket 62 prior to assembly and hot pressing of the UEA 12. The sealing bead 76 may be formed intermediate the subgasket 62 and a removable substrate. Prior to hot pressing, the substrate is removed to expose the sealing bead 76 to facilitate contact between the sealing bead 76 and electrolyte membrane 60 for heating and hot pressing. The sealing bead 76 may also be applied to the subgasket 62 once the subgasket 62 is positioned adjacent to the electrolyte membrane 60 during assembly, thereby adhering the subgasket 62 and electrolyte membrane 60 together.

While certain representative embodiments and details have been shown for purposes of illustrating the invention, it will be apparent to those skilled in the art that various changes may be made without departing from the scope of the disclosure, which is further described in the following appended claims.

What is claimed is:

1. A unitized electrode assembly for a fuel cell comprising:
    an electrolyte membrane;
    a subgasket disposed adjacent said electrolyte membrane; and
    a sealing bead disposed adjacent said subgasket and said electrolyte membrane, said sealing bead adapted to militate against deflection of said electrolyte membrane during operation of a fuel cell.

2. The unitized electrode assembly for a fuel cell according to claim 1, further comprising a diffusion medium having a first portion disposed adjacent said electrolyte membrane and a second portion disposed adjacent a portion of said subgasket.

3. The unitized electrode assembly for a fuel cell according to claim 2, wherein said sealing bead is adapted to fill a void created between said diffusion medium, said sealing bead, and said subgasket.

4. The unitized electrode assembly for a fuel cell according to claim 2, wherein the unitized electrode assembly is assembled by hot pressing said electrolyte membrane, said subgasket, and said diffusion medium.

5. The unitized electrode assembly for a fuel cell according to claim 1, wherein said subgasket is formed from a polymeric film.

6. The unitized electrode assembly for a fuel cell according to claim 1, wherein said sealing bead is formed from an ionomer.

7. The unitized electrode assembly for a fuel cell according to claim 6, wherein the ionomer further comprises one of a hot melt adhesive, a b-stage adhesive, perfluorosulfonic acid, ethylene vinyl acetate, polyvinylidenefluoride, and a pressure sensitive adhesive.

8. The unitized electrode assembly for a fuel cell according to claim 1, wherein said sealing bead is doped with an additive.

9. The unitized electrode assembly for a fuel cell according to claim 8, wherein the additive is one of cerium, manganese, vanadium, platinum, ruthenium, zirconium, nickel, chromium, tungsten, cobalt, molybdenum, and tin.

10. The unitized electrode assembly for a fuel cell according to claim 8, wherein the additive in said sealing bead added in equivalent ratios of metal in the additive to acid in the ionomer in a range from a ratio of about 0.02 to about 0.3.

11. The unitized electrode assembly for a fuel cell according to claim 1, wherein said sealing bead is formed on said subgasket prior to the assembly of the unitized electrode assembly.

12. The unitized electrode assembly for a fuel cell according to claim 1, wherein said sealing bead is applied to said subgasket and said electrolyte membrane during assembly of the unitized electrode assembly to adhere said subgasket and said electrolyte membrane together.

13. The unitized electrode assembly for a fuel cell according to claim 1, wherein said sealing bead is formed intermediate said subgasket and a substrate adapted to be removed from said sealing bead prior to assembly of the unitized electrode assembly.

14. A unitized electrode assembly for a fuel cell comprising:
    an electrolyte membrane;
    a subgasket disposed adjacent said electrolyte membrane;
    a diffusion medium having a first portion disposed adjacent said electrolyte membrane and a second portion disposed adjacent a portion of said subgasket; and
    a sealing bead disposed adjacent said subgasket and said electrolyte membrane, said sealing bead adapted to militate against deflection of said electrolyte membrane during operation of a fuel cell by filling a void created between said diffusion medium, said sealing bead, and said subgasket.

15. The unitized electrode assembly for a fuel cell according to claim 14, wherein said sealing bead is formed from one of a hot melt adhesive, a b-stage adhesive, perfluorosulfonic acid, ethylene vinyl acetate, polyvinylidenefluoride, and a pressure sensitive adhesive.

16. The unitized electrode assembly for a fuel cell according to claim 14, wherein said sealing bead is doped with one of cerium, manganese, vanadium, platinum, ruthenium, zirconium, nickel, chromium, tungsten, cobalt, molybdenum, and tin.

* * * * *